United States Patent [19]

Terasaki et al.

[11] Patent Number: 5,684,768
[45] Date of Patent: Nov. 4, 1997

[54] METHOD AND APPARATUS FOR FORMING UNIT FROM IMAGE DATA, SOUND DATA, AND HEADER DATA DIVIDED AT PREDETERMINED POSITIONS THEREIN, AND METHOD, APPARATUS, AND RECORDIG MEDIUM FOR REPRODUCING UNIT

[75] Inventors: Setsuo Terasaki, Kamakura; Masaki Nakagawa, Zama, both of Japan

[73] Assignee: Kabushiki Kaisha Toshiba, Kawasaki, Japan

[21] Appl. No.: 417,237

[22] Filed: Apr. 5, 1995

[30] Foreign Application Priority Data

Apr. 8, 1994 [JP] Japan .................... 6-070901

[51] Int. Cl.⁶ ............................................ G11B 5/09
[52] U.S. Cl. .................... 369/47; 369/58; 360/48
[58] Field of Search ...................... 360/33.1, 336, 360/48; 369/47, 48, 54, 58, 59, 60, 33; 358/335, 310, 341, 342, 343, 314

[56] References Cited

U.S. PATENT DOCUMENTS 5,079,630  1/1992  Golin et al. .
5,241,382  8/1993  Paik et al. .
5,502,573  3/1996  Fujinami ................... 360/33.1 X

FOREIGN PATENT DOCUMENTS 0424903  5/1991  European Pat. Off. .
0558848  9/1993  European Pat. Off. .
0579075  1/1994  European Pat. Off. .

Primary Examiner—P. W. Huber
Attorney, Agent, or Firm—Cushman, Darby & Cushman IP Group of Pillsbury Madison & Sutro LLP

[57] ABSTRACT

A data unit is constructed of a header, sound data, and image data. The sound data and the image data are data sampled at predetermined unit time intervals. These data are divided at predetermined positions of the unit. The header and sound data are fixed length type data. The image data may be fixed length type data or variable length type. Even if the image data is compressed variable length type data, because the sound data is fixed length type data, the recording time of the sound data on a medium can be predicted. Even if a non-correctable error takes place at the header, because the divided positions of these data are fixed, each data can be separated and reproduced from the unit.

6 Claims, 5 Drawing Sheets

METHOD AND APPARATUS FOR FORMING UNIT FROM IMAGE DATA, SOUND DATA, AND HEADER DATA DIVIDED AT PREDETERMINED POSITIONS THEREIN, AND METHOD, APPARATUS, AND RECORDIG MEDIUM FOR REPRODUCING UNIT

BACKGROUND OF THE INVENTION

1. Field of the Invention

The present invention relates to a recording medium such as an optical disc, a method and an apparatus for recording data on the recording medium, and a method and an apparatus for reproducing the recorded data from the recording medium.

2. Description of the Related Art

In recent years, optical disc reproducing apparatuses that reproduce sound data and image data recorded as digital data on optical discs have been developed and widely used. The reproducing apparatuses have been widely used to reproduce data from, for example movie discs and orchestral (so-called KARAOKE) discs. Because the size of these optical discs is the same as the size of CDs (compact discs), the overall size of the optical disc reproducing apparatuses can be reduced. As a background to the development of the optical disc reproducing apparatuses, international standards on image compression have been established. As an example of these standards, MPEG (Moving Picture Image coding Expert Group) has been adopted. MPEG1 is a system of which image data is compressed in a variable length.

Figure 10:
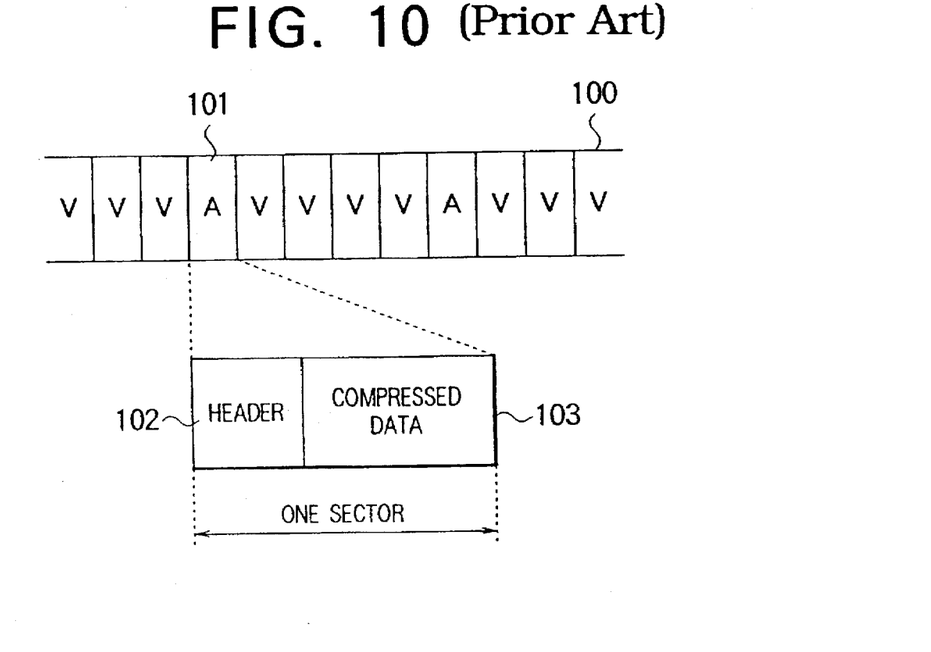
FIG. 10 is a schematic diagram showing a construction of a conventional record data.

FIG. 10 shows a physical recording format of compressed variable length type data on an optical disc. Image data and sound data which are compressed variable length type data are divided into sectors 101 that are physical units of data on the disc. Each sector 101 is constructed of a header region 102 and a data region 103. The header region 102 records various management information, such as a sector number and data type recorded in the data region 103. The data region 103 records compressed data of an image and a sound. To synchronize image data and sound data, sectors V for image data and sectors A for sound data are arranged corresponding a predetermined cyclic rule. In this example, four image sectors V are cyclically followed by one sound sector A.

However, when variable length type data is divided into fixed length type sectors, because the reproducing apparatus requires a complicated time management, it cannot properly randomly access the data.

Figure 11:
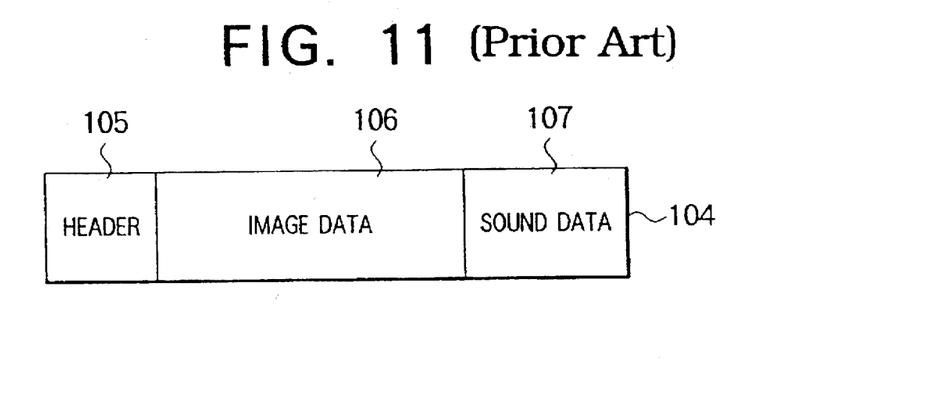
FIG. 11 is a schematic diagram showing a construction of a conventional data unit.
Figure 12:
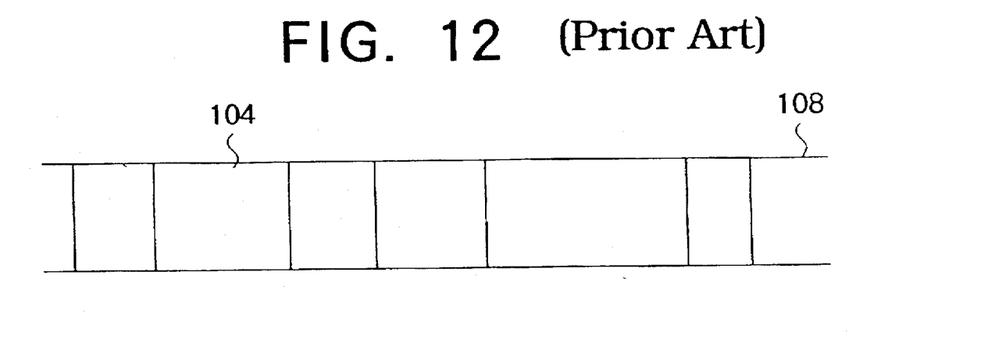
FIG. 12 is a schematic diagram showing a group of data units shown in FIG. 11.

To solve this problem, the following method is employed. As shown in FIG. 11, data is recorded as data units on a medium. Referring to FIG. 11, the data unit 104 is constructed of a header 105, image data 106, and sound data 107. The image data 106 and the sound data 107 are compressed data of variable lengths. The data length of the data unit 104 is defined corresponding to a predetermined unit time interval (for example, one second). Thus, as shown in FIG. 12, a data stream 108 is recorded as an arrangement of data units of variable length type data. The header 105 includes various management information, such as position information of the image data 106 and the sound data 107 in the data unit, and information necessary for reproducing data in the data unit.

When image data and sound data are grouped as data units, because the time management is easier than the method for dividing data as sectors, a system suitable for random access can be accomplished.

However, in the system using data units, there is the following problem. Although the amount of recording data on the disc is fixed, since the lengths of both the image data and the sound data are variable, the recording time of data recorded on one disc cannot be predicted. Thus, the determination of the data amount recorded on one optical disc and the determination of the number of optical discs that can record the required data amount should be made by the user through his experience or his trial and error.

Because the data units include variable length type data, if header data that records position information of each data in a data unit cannot be read, image data and sound data in the unit cannot be read.

SUMMARY OF THE INVENTION

When data units include variable length image data and variable length sound data, the recording time of the image data and the sound data cannot be predicted. When a non-correctable error takes place in header data, image data and sound data therein cannot be reproduced.

The present invention solves such problems. An object of the present invention is to provide a system that can predict the recording time of image data and sound data, even if data units including variable length data are recorded.

Another object of the present invention is to provide a system that can correctly reproduce image data and sound data from data units even if a non-correctable error takes place in the header data.

To solve such a problem, according to a first aspect of the present invention, image data, sound data, and header data in a unit is divided at predetermined positions. Thus, even if data placed at the last portion is variable length type data, the data amount of each unit becomes constant, except for data placed at the last portion of the unit. Consequently, the recording time of either image data or sound data on a medium can be predicted. Corresponding to the predicted recording time, it can be determined whether or not all required data is recorded on the medium. Even if a non-correctable error takes place in header data that records position information of each data in a unit, because the divided positions of each data in the unit are fixed, corresponding to the divided positions, image data and sound data can be separated and reproduced from the unit.

According to a second aspect of the present invention, the image data, sound data, and header data are divided at predetermined positions of a unit. The divided positions are common in each unit group. Thus, even if the bit rate of the data is varied for each unit group, the same effect as the above-described construction can be obtained.

According to a third aspect of the present invention, because the image data that has been compressed in a variable length is placed at the last portion of a unit, divided positions of the image data, sound data, and header data can be fixed.

According to a fourth aspect of the present invention, the header data is of a fixed length type. Sound data has a fixed amount of compressed data of a variable length type data. Compressed variable length type image data is positioned at the last position of a unit. Thus, the divided positions of these data can be fixed.

According to a fifth aspect of the present invention, because any data is added to the second header data of image data and sound data, the divided positions of these data can be fixed without the need to change the substances of the image data and sound data.

According to a sixth aspect of the present invention, because main image data, sub image data, sound data, and header data in a unit are divided at predetermined positions, even if data that is placed at the last portion of the unit is variable length type data, the data amount of each unit is constant, except for the data that is placed at the last portion. Thus, except for one of the main image data, sub image data, and sound data, the recording time of each data on a medium can be predicted. Corresponding to the predicted recording time, it can be determined whether or not all required data is recorded on the medium. In addition, even if a non-correctable error takes place in header data that records position information of each data in the unit, for example, because the divided positions of each data in the unit are fixed, corresponding to the divided positions, the main image data, sub image data, and sound data can be separated and reproduced from the unit.

According to a seventh aspect of the present invention, because the main image data, sub image data, sound data, and header data are divided at predetermined positions in a unit and the divided positions are common in each unit group, even if the bit rate of data each unit is varied, the same effects discussed above with respect to a first aspect of the invention can be obtained.

According to an eighth aspect of the present invention, because the compressed variable length type main image data is placed at the last portion of a unit, divided positions of the main image data, sub image data, and sound data can be fixed.

According to a ninth aspect of the present invention, the header data is of fixed length type. Sound data and sub image data are data having fixed data amount of compressed data in variable lengths. Compressed variable length type main image data is placed at the last portion of the unit. Thus, divided positions of these data can be fixed.

According to a tenth aspect of the present invention, because any data is added to the second header data in the main image data, sub image data, and sound data, divided positions of these data can be fixed without the need to change substances of the main image data, the sub image data, and the sound data.

According to an eleventh aspect of the present invention, when a unit forming means forms a unit from at least image data and sound data sampled at predetermined unit time intervals along with header data that manage these data, because positions of these data are determined and these data are recorded on a medium corresponding to the divided positions, the image data, the sound data, and the header data are divided at predetermined positions in common with each unit.

According to a twelfth embodiment of the present invention, a compressing means converts image data into compressed data of variable length type and supplies the compressed data to a unit forming means. A second data placing means places the compressed data at the last portion of the unit.

According to a thirteenth aspect of the present invention, even if a non-correctable error takes place in header data, image data and sound data are separated and reproduced from unit data at predetermined divided positions of the image data, sound data, and header data.

According to a fourteenth aspect of the present invention, main image data, sub image data, and sound data can be separated and reproduced from unit data at determined divided positions of the main image data, sub image data, sound data, and header data.

These and other objects, features and advantages of the present invention will become more apparent in light of the following detailed description of best mode embodiments thereof, as illustrated in the accompanying drawings.

DESCRIPTION OF THE PREFERRED EMBODIMENTS

Next, with reference to the accompanying drawings, an embodiment of the present invention will be described.

Figure 1:
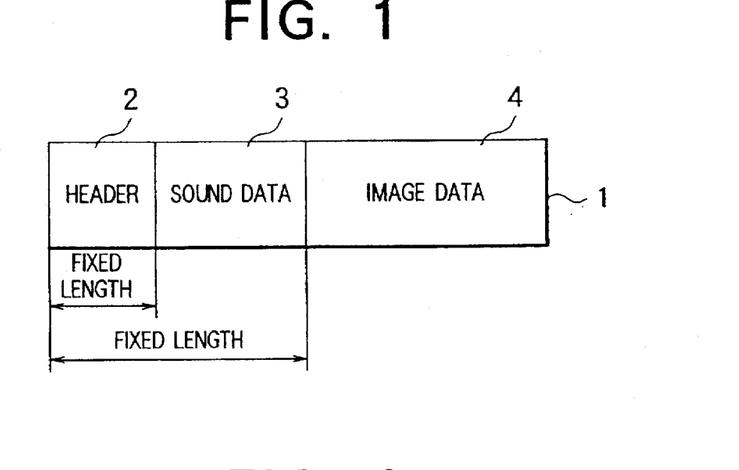
FIG. 1 is a schematic diagram showing a construction of a data unit according to an embodiment of the present invention.

FIG. 1 is a schematic diagram showing a construction of a data unit on a recording medium according to an embodiment of the present invention. As shown in FIG. 1, a data unit 1 is constructed of a header 2, sound data 3, and image data 4. The header 2 records management information that manages the data 3 and 4, such as start sector numbers of the sound data 3 and the image data 4 in the unit 1. The sound data 3 and the image data 4 are data sampled at predetermined unit time intervals. The header 2, the sound data 3, and the image data 4 are divided at predetermined positions in the unit 1. In other words, at least both the header 2 and the sound data 3 are of fixed length type, whereas the image data 4 may be of fixed length type or variable length type.

Figure 2:
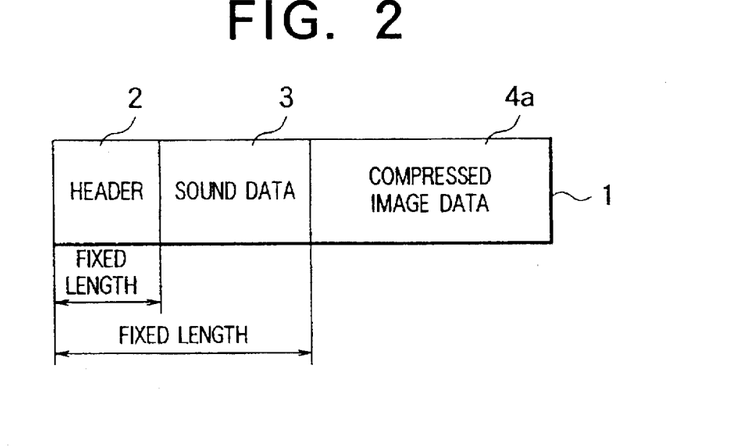
FIG. 2 is a schematic diagram showing a construction of a data unit in the case where the image data shown in FIG. 1 is compressed data.

According to the construction of the data unit 1, when the image data 4 is of fixed length type or even if the image data 4 is compressed image data 4a of fixed length type that has been highly efficiently encoded corresponding to MPEG1 or the like as shown in FIG. 2, because the sound data 3 is of fixed length type, the recording time of the sound data 3 on a recording medium, such as an optical disc, can be predicted. Corresponding to the predicted recording time, the recording time of all required data including the compressed image data 4a on the recording medium can be predicted. In addition, even if a non-correctable error takes place at the header 2, because divided positions of the data 2, 3, and 4 (4a) in the unit 1 are fixed, the sound data 3 and the image data 4 (the compressed image data 4a) can be separated and reproduced from the unit 1 based on the divided positions.

Figure 3:
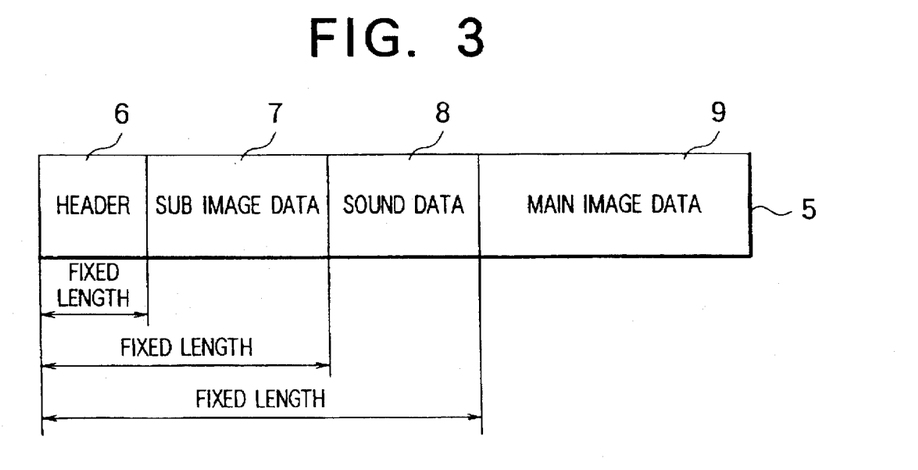
FIG. 3 is a schematic diagram showing a construction of a data unit according to another embodiment of the present invention.

FIG. 3 is a schematic diagram showing a construction of a data unit on a recording medium according to another embodiment of the present invention. As shown in FIG. 3, a data unit 5 is constructed of a header 6, sub image data 7, sound data 78, and main image data 9. The header 6 records management information that manages the data 7, 8, and 9, such as start sector numbers of the sub image data 7, sound data 8, and main image data 9 in the unit 5. The sub image data 7, the sound data 8, and the main image data 9 are data sampled at respective unit time intervals. The header 6, the sub image data 7, the sound data 8, and the main image data 9 are divided at predetermined positions in the unit 5. In other words, although at least the header, the sub image data 7, and the sound data 8 are of fixed length type, the main image data 9 may be of fixed length type or variable length type.

Figure 4:
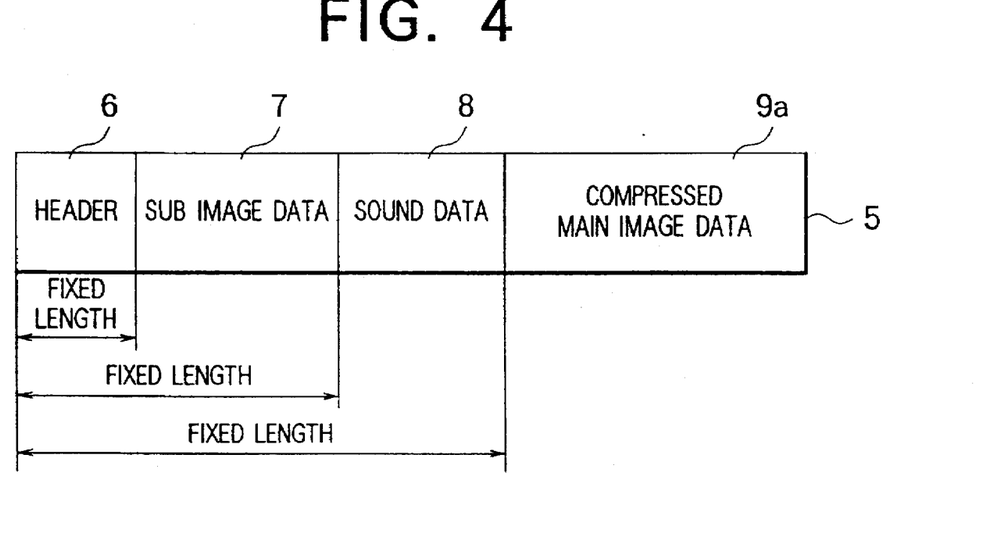
FIG. 4 is a schematic diagram showing a construction of a data unit in the case where the image data shown in FIG. 3 is compressed data.

According to the construction of the data unit 5, when the main image data 9 is of fixed length type or even if the main image data 9 is compressed image data 9a of fixed length type that has been highly efficiently encoded corresponding to MPEG1 or the like as shown in FIG. 4, because the sub image data 7 and the sound data 8 are of fixed length type, the recording time of the sub image data 7 and the sound data 3 on a recording medium, such as an optical disc, can be predicted. Corresponding to the predicted recording time, the recording time of all required data, including the compressed image, data 9a on the recording medium can be predicted. In addition, even if a non-correctable error takes place at the header 6, since divided positions of the data 6, 7, 8, and 9 (9a) in the unit 5 are fixed, corresponding to the divided positions, the sub image data 7, the sound data 8, and the main image data 9 (the compressed main image data 9a) can be separated and reproduced from the unit 5.

As shown in FIG. 2 or 4, when image data or main image data is compressed data, the image data or the main image data should be placed at the last portion of a unit.

Figure 5:
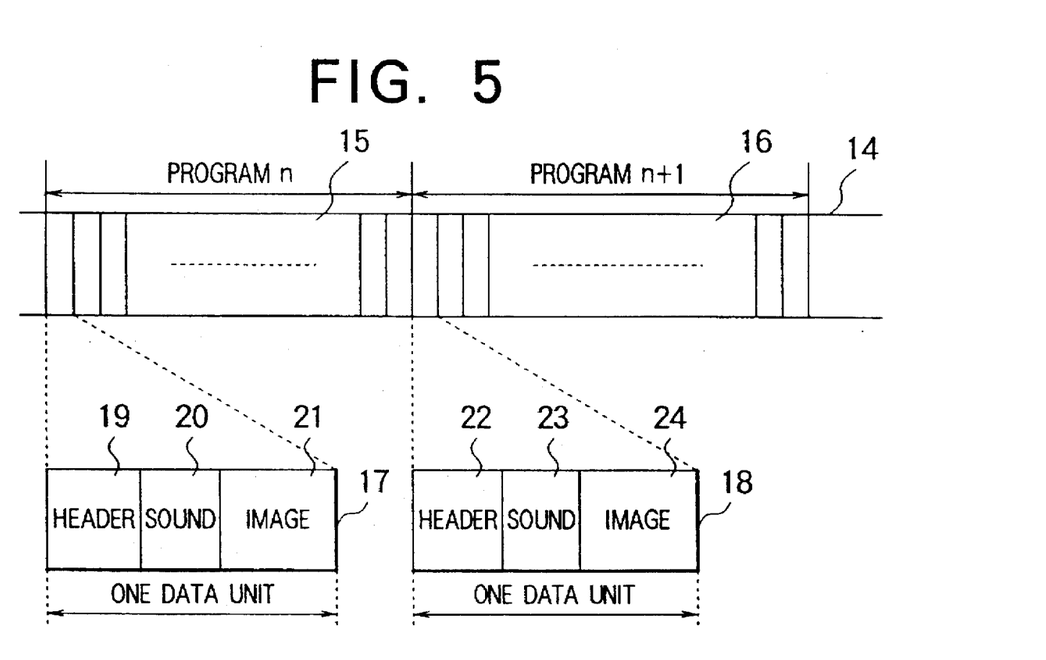
FIG. 5 is a schematic diagram showing a construction of a data unit in the case where the divided positions of each data in each of a plurality of data units are variable.

FIG. 5 is a schematic diagram showing a construction of a data unit according to another embodiment of the present invention. In FIG. 5, reference numeral 14 represents data recorded on a medium. The data is a group of data units. Reference numerals 15 and 16 represent groups that have any number of data units. Hereinafter, the groups are referred to as programs. Data units 17 and 18 that construct the programs 15 and 16 (n and n+1) have the construction shown, for example, in FIG. 1. The data units 17 and 18 include headers 19 and 22, sound data 20 and 23, and image data 21 and 24, respectively.

The amount of the sound data 23 in the data unit 18 is larger than the amount of the sound data 20 in the data unit. In other words, divided positions of the sound data and the image data in the data unit 17 are different from those in the data unit 18.

When the divided positions of sound data and image data are fixed in each group constructed of any number of units, the bit rate of data in each group can be varied.

Figure 6:
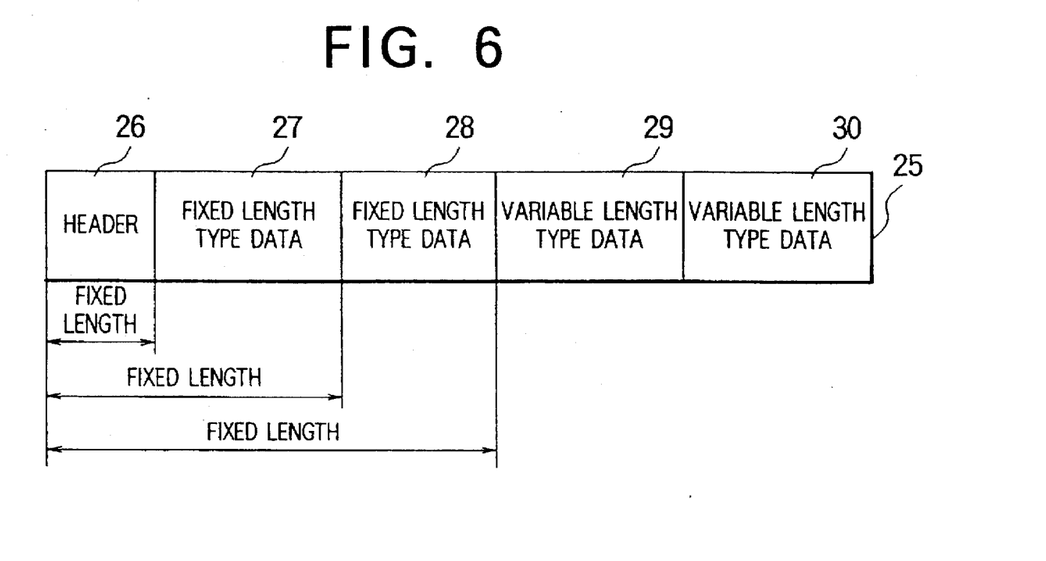
FIG. 6 is a schematic diagram showing a construction of a data unit corresponding to another embodiment of the present invention.

FIG. 6 is a schematic diagram showing a construction of a data unit of a recording medium according to another embodiment of the present invention. In FIG. 6, a data unit 25 is constructed of a header 26, a plurality of (for example two) fixed length type data 27 and 28, and a plurality of (for example two) variable length type data 29 and 30. The fixed length type data 27 and 28 and the variable length type data 29 and 30 may be any data, such as sound data and image data. An important point of this construction of the data unit 25 is that the fixed length type data 27 and 28 are followed by the variable length type data 29 and 30. In the construction of the data unit, the fixed length type data 28 and the variable length type data 29 can be reproduced regardless of the information of the header 26.

Figure 7:
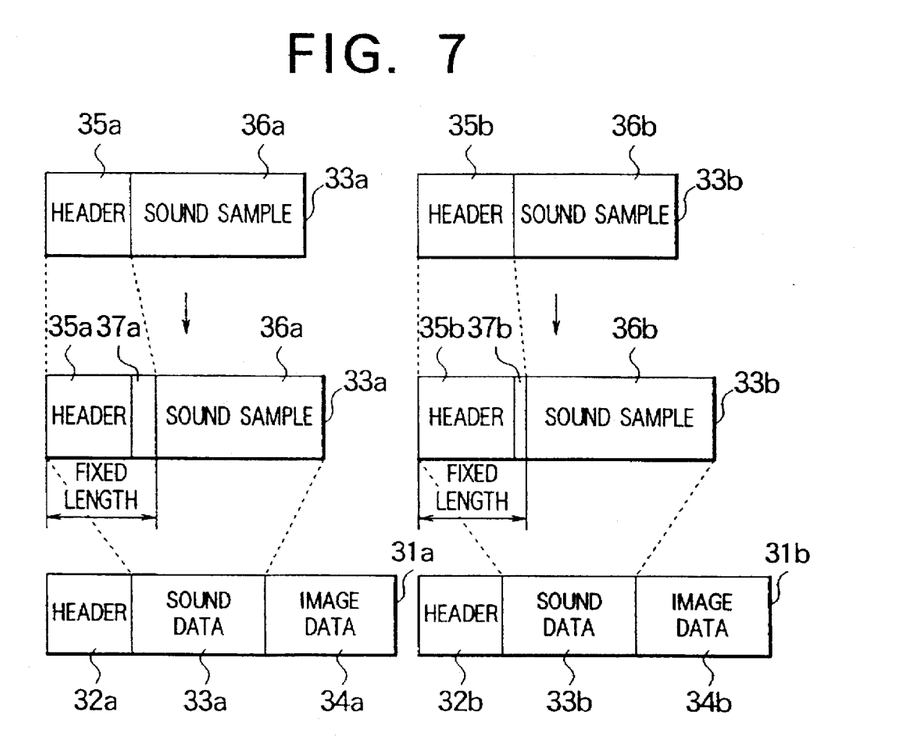
FIG. 7 is a schematic diagram for explaining a method for forming data of fixed length type.

FIG. 7 is a schematic diagram showing a construction of a data unit according to another embodiment of the present invention. In this embodiment, image data and sound data are actively formed at a fixed length. In FIG. 7, reference numerals 31a and 31b represent data units. The data units 31a and 31b are constructed of headers 32a and 32b, sound data 33a and 33b, and image data 34a and 34b, respectively. The first row of FIG. 7 show constructions of the sound data 33a and 33b. The sound data 33a and 33b are constructed of headers 35a and 35b and sound samples 36a and 36b, respectively. The headers 35a and 35b record management information, such as sampling frequencies of the sound samples 36a and 36b of the sound data 33a and 33b, respectively. The headers 35a and 35b are different from the headers 32a and 32b, which manage the entire unit, respectively.

The data amount in the sound sample 36a is the same as the data amount of the sound sample 36b. However, the data amount in the header 35a is different from the data amount in the header 35b. At least one of data 37a and 37b is added to the corresponding headers 35a and 35b so that the data amount of the sound data 33a is the same as the data amount of the sound data 33b. In addition, such data is added to the headers of the image data 34a and 34b so that the data amount of the image data 34a is the same as the data amount of the image data 34b. This applies to other data.

In the above-described embodiment, it is assumed that the sound data and sub image data are of fixed length type. Even if the sound data and sub image data are compressed variable length type data that have been highly efficiently encoded, the data amount of these data can be fixed without largely affecting the reproduction of data. Thus, these data can be substantially treated as fixed length type data. On the other hand, because the data amount of main image data and the like cannot be substantially fixed, the compressed data of the main image should be placed at the last portion of the data unit. In this construction, the divided positions of these data of the data unit can be fixed.

Next, a recording apparatus that records the above-described data unit on a medium will be described.

Figure 8:
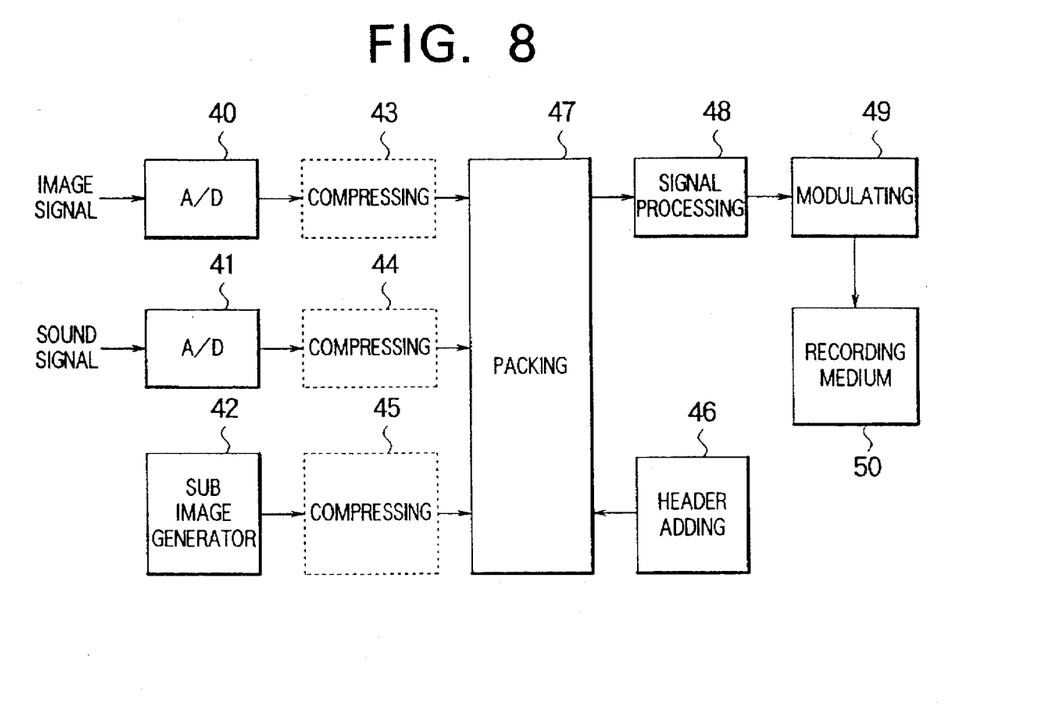
FIG. 8 is a block diagram showing a hardware construction of a recording apparatus that records data units to a medium corresponding to each embodiment of the present invention.

FIG. 8 is a block diagram showing a hardware construction of a recording apparatus according to the present invention. In FIG. 8, reference numeral 40 is an A/D converter that converts a main image signal sampled at a predetermined unit time interval into digital image data. Reference numeral 41 is an A/D converter that converts a sound signal sampled at a predetermined unit time interval into digital sound data. Reference numeral 42 is a sub image generator that generates sub image data. The A/D converter 40 supplies the main image data to a compressing circuit 43. The compressing circuit 43 compresses the main image data and supplies the compressed data to a packing circuit 47. The A/D converter 41 supplies the sound data to a compressing circuit 44. The compressing circuit 44 compresses the sound data and supplies the compressed data to the packing circuit 47. Likewise, the sub image generator 42 supplies the sub image data to a compressing circuit 45. The compressing circuit 45 compresses the sub image data and supplies the compressed sub image data to the packing circuit 47. The packing circuit 47 packs the main image data, the sound data, and the sub image data along with a header received from a header adding circuit 46 in the form of a data unit. The packing circuit 47 supplies the data unit to a signal process portion 48. In other words, the packing circuit 47 forms the above-described data unit according to the present invention. The signal process portion 48 performs a parity adding process and so forth for the unit data and supplies the resultant data to a modulating circuit 49. The modulating circuit 49 modulates the input data corresponding to the signal recorded on the medium and supplies the modulated data to a recording portion (not shown). The recording portion records the modulated data on the recording medium 50. The recording medium 50 may be an optical disc, a magnetic disk, a magnetic tape, a semiconductor device, or the like. The compressing circuits 43 to 45 may be omitted corresponding to the type of the data unit.

Next, a reproducing apparatus that reproduces data from the recording medium according to this embodiment will be described.

Figure 9:
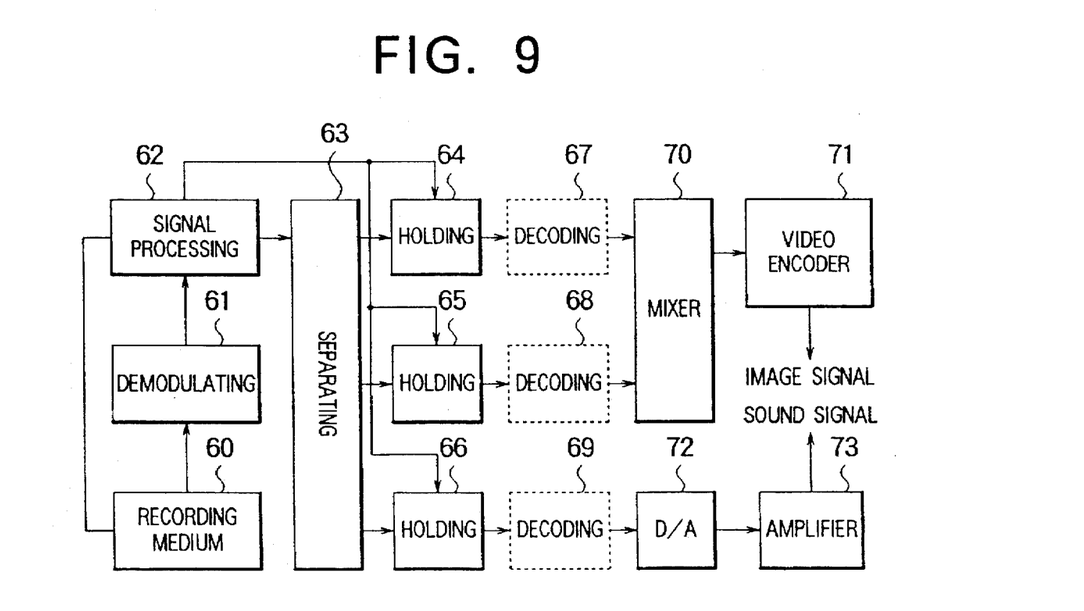
FIG. 9 is a block diagram showing a hardware construction of a reproducing apparatus that reproduces data from a recording medium corresponding to each embodiment of the present invention.

FIG. 9 is a block diagram showing a hardware construction of the reproducing apparatus. In FIG. 9, reference numeral 60 is a recording medium. Data on the recording medium 60 is read by a reading portion (not shown). The reading portion supplies the resultant data to a demodulating circuit 61. The demodulating circuit 61 demodulates the input data and supplies the demodulated data to a signal process circuit 62. The signal process circuit 62 performs an error correcting process and the like for the demodulated data. At this point, the signal process circuit 62 determines whether or not a non-correctable error takes place at a header. When the signal process circuit 62 does not detect the error, it supplies the demodulated data to a separating portion 63. The separating portion 63 separates main image data, sub image data, and sound data from the unit data corresponding to start sector addresses and the like of these data recorded at the header and supplies the separated data to holding portions 64 to 66. The holding portions 64 to 66 hold these data. At this point, the separating portion 63 can separate each data from the unit data regardless of the header information. In other words, when the signal process circuit 62 has determined that a non-correctable error takes place at the header, the separating portion 63 separates each data from the data unit corresponding to the fixed divided positions of data unit. When the divided positions of these data in the data unit are fixed, these data can be correctly separated.

In the case where not all the divided positions of each data in the data unit are not fixed, the reproducing apparatus performs the following process. When the signal process circuit 62 has determined that a non-correctable error takes place at the header, the signal process circuit 62 supplies the detected signal to the holding portions 64 to 66. The holding portions 64 to 66 perform the following operations corresponding to the detected signal.

1) When the data to be held is data that starts with a fixed divided position in the data unit, the hold portion supplies the data to the circuit on the next stage.

2) When the data to be held is data other than data that starts with a fixed divided position in the data unit, the hold portion does not supply the data to the circuit on the next stage.

The data that are output from the holding portions 64, 65, and 66 are supplied to decoders 67, 68, and 69, respectively. The decoders 67, 68, and 69 decode the received data. The decoders 67 and 68 supply the decoded data of main image data and sub image data to a mixer 70. The mixer 70 mixes the main image and the sub image data and supplies the mixed data to a video encoder 71. The video encoder 71 outputs the mixed data as an image signal to the outside of the reproducing apparatus. On the other hand, the decoder 69 supplies the sound data to a D/A converter 71. The D/A converter 72 converts the sound data into an analog signal and supplies the analog signal to the outside of the reproducing apparatus through an amplifier 73.

As described above, according to the present invention, because the image data, sound data, and header data in a unit are divided at predetermined positions in the unit, even if data is of variable length type, the physical data amount of each unit is constant except for data that is placed at the last portion of the data unit. In other words, the recording time of one of the image data and sound data on a medium can be predicted. In addition, corresponding to the predicted recording time, it can be determined whether or not all required data is recorded on the medium. Even if a non-correctable error takes place in the header data that records position information of each data in the unit, because the divided positions of these data in the unit are fixed, the image data and sound data can be separated and reproduced from the data unit corresponding to the divided positions.

In addition, according to the present invention, because the main image data, the sub image data, the sound data, and the header data in the unit are divided at predetermined positions in the unit, even if data is of variable length type, the physical data amount of each unit becomes constant except for data placed at the last portion of the unit. In other words, except for one of the main image data, the sub image data, and the sound data, the recording time of each data on the recording medium can be predicted. Corresponding to the predicted recording time, it can be determined whether or not all required data is recorded on the medium. Even if a non-correctable error takes place at header data that records position information and the like of each data in the unit, because the divided positions of the data in the unit are fixed, corresponding to the divided positions, the main image data, the sub image data, and the sound data can be separated and reproduced from the unit.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A method for reproducing data, the data being stored as a data unit that includes a fixed length of header data, a fixed length of sound data adjacent to the header data and image data adjacent to the sound data so that respective starting positions of the header data, the sound data, and the image data in the data unit are predetermined for the data unit, the header data being adapted for managing reproduction of the image data and the sound data, the method comprising the steps of:

reading the data in the data unit;

determining whether or not a non-correctable error takes place in reading the header data; and separating and reproducing the image data and the sound data from the data unit based on the respective predetermined starting positions of the header data, the sound data, and the image data within the data unit responsive to a determination that the non-correctable error has taken place in reading the header data.

2. A method for reproducing data, the data being stored as a data unit that includes main image data, a fixed length of sub image data, a fixed length of sound data, and a fixed length of header data, the sub image data and sound data being disposed between the header data and the main image data so that respective starting positions of the header data, the sub image data, the sound data, and the main image data in the data unit are predetermined within the data unit, the header data being adapted for managing reproduction of the main image data, the sub image data, and the sound data, the method comprising the steps of:

reading the data in the data unit;

determining whether or not a non-correctable error takes place in reading the header data; and separating and reproducing the main image data, the sub image data, and the sound data from the data unit based on the respective predetermined starting positions of the header data, the sub image data, the sound data, and the image data within the data unit responsive to a determination that the non-correctable error has taken place in reading the header data.

3. A data reproducing apparatus for reproducing data, the data being stored as a data unit that includes a fixed length of header data, a fixed length of sound data adjacent to the header data and image data adjacent to the sound data so that respective starting positions of the header data, the sound data and the image data in the data unit are predetermined within the data unit, the header data being adapted for managing reproduction of the image data and the sound data, comprising:

means for reading the data in the data unit;

means for determining whether or not a non-correctable error takes place in reading the header data; and means for separating and reproducing the image data and the sound data from the data unit based on the respective predetermined starting positions of the header data, the sound data, and the image data within the data unit responsive to a determination that the non-correctable error has taken place in reading the header data.

4. A data reproducing apparatus for reproducing data, the data being stored as a data unit that includes a fixed length of header data, a fixed length of sub image data, a fixed length of sound data, and main image data, the sub image data and sound data being disposed between the header data and the main image data so that respective starting positions of the header data, the sub image data, the sound data, and the main image data in the data unit are predetermined for the data unit, the header data being adapted for managing reproduction of the main image data, the sub image data, and the sound data, comprising:

means for reading the data in the data unit;

means for determining whether or not a non-correctable error takes place in reading the header data; and means for separating and reproducing the main image data, the sub image data, and the sound data from the data unit based on the respective predetermined starting positions of the header data, the sub image data, the sound data, and the image data within the data unit responsive to a determination that the non-correctable error has taken place in reading the header data.

5. A data reproducing apparatus for reproducing data, the data being stored as a data unit that includes a fixed length of header data, a fixed length of sound data adjacent to the header data and image data so that respective starting positions of the header data, the sound data and the image data in the data unit are predetermined for the data unit, the header data being adapted for managing reproduction of the image data and the sound data, comprising:

a playback unit reading the data in the data unit;

a signal processing circuit determining whether or not a non-correctable error takes place in reading the header data; and a separating circuit reproducing the image data and the sound data from the data unit based on the respective predetermined starting positions of the header data, the sound data, and the image data within the data unit responsive to a determination by the signal processing circuit that the non-correctable error has taken place in reading the header data.

6. A data reproducing apparatus for reproducing data, the data being stored as a data unit that includes a fixed length of header data, a fixed length of sub image data, a fixed length of sound data, and main image data, the sub image data and sound data being disposed between the header data and the main image data so that respective starting positions of the header data, the sub image data, the sound data, and the main image data in the data unit are predetermined for the data unit, the header data being adapted for managing reproduction of the main image data, the sub image data, and the sound data, comprising:

a reading unit reading the data in the data unit;

a signal processing circuit determining whether or not a non-correctable error takes place in reading the header data; and a separating circuit reproducing the main image data, the sub image data, and the sound data from the data unit based on the respective predetermined starting positions of the header data, the sub image data, the sound data, and the image data within the data unit responsive to a determination by the signal processing circuit that the non-correctable error has taken place in reading the header data.

* * * * *

UNITED STATES PATENT AND TRADEMARK OFFICE
CERTIFICATE OF CORRECTION

PATENT NO. : 5,684,768
DATED : November 4, 1997
INVENTOR(S) : Terasaki et al.

It is certified that error appears in the above-identified patent and that said Letters Patent is hereby corrected as shown below:

Column 1, line 22, after "example", insert a comma --,--.

Column 3, line 47, before "because", insert --and--.

Signed and Sealed this

Fifth Day of May, 1998

Attest:

BRUCE LEHMAN

*Attesting Officer*  *Commissioner of Patents and Trademarks*